(12) United States Patent
Arnott

(10) Patent No.: US 6,275,892 B1
(45) Date of Patent: Aug. 14, 2001

(54) SYSTEM FOR ON-LINE DISK SYSTEM CONFIGURATION

(75) Inventor: Randy Marc Arnott, Mont Vernon, NH (US)

(73) Assignee: Adaptec, Inc., Milpitas, CA (US)

( * ) Notice: Subject to any disclaimer, the term of this patent is extended or adjusted under 35 U.S.C. 154(b) by 0 days.

(21) Appl. No.: 09/474,204

(22) Filed: Dec. 29, 1999

Related U.S. Application Data

(62) Division of application No. 08/964,356, filed on Nov. 4, 1997, now Pat. No. 6,032,217.

(51) Int. Cl.[7] .................................................. G06F 13/14
(52) U.S. Cl. ........................... 710/200; 711/152; 714/5; 714/7; 714/15
(58) Field of Search ........................... 710/200; 711/152; 714/5, 7, 15

(56) References Cited

U.S. PATENT DOCUMENTS

| | | | |
|---|---|---|---|
| 5,390,187 | 2/1995 | Stallmo | 364/268.5 |
| 5,515,499 | 5/1996 | Allen et al. | 714/15 |
| 5,574,851 | 11/1996 | Rathunde | 364/242.31 |
| 5,623,670 | 4/1997 | Bohannon et al. | 710/200 |
| 5,809,224 | * 9/1998 | Schultz et al. | 714/7 |
| 5,893,160 | 4/1999 | Loewenstein et al. | 711/152 |
| 6,058,489 | * 5/2000 | Schultz et al. | 714/7 |
| 6,122,685 | * 9/2000 | Bachmat | 710/74 |

* cited by examiner

*Primary Examiner*—Thomas Lee
*Assistant Examiner*—Abdelmoniem Elamin
(74) *Attorney, Agent, or Firm*—Cesari and McKenna, LLP

(57) ABSTRACT

The system enables on-line container reconfiguration with minimal interference to the on-line processing by blocking all incoming I/O requests into the container drivers. The drivers queue the incoming I/O requests, continue to process all the preexisting I/O requests and signal the system upon completion. Upon receiving signals from all the container drivers with preexisting I/O requests, the system reconfigures the container tables as requested in the reconfiguration request. When the reconfiguration is complete, the system unblocks the blocked I/O requests and processes them and subsequent requests in accordance with the new configuration. By temporarily blocking the I/O requests and dynamically reconfiguring the container tables while the file system is still processing other I/O requests, the system performs on-line container reconfigurations with minimal interference with other on-line processing.

10 Claims, 8 Drawing Sheets

SYSTEM FOR ON-LINE DISK SYSTEM CONFIGURATION

RELATED APPLICATION

This is a divisional of U.S. patent application Ser. No. 08/964,356 filed Nov. 4, 1997, now U.S. Pat. No. 6,032,217.

FIELD OF THE INVENTION

The invention relates generally to the field of computer systems and more particularly provides a method for reconfiguring storage devices of a computer system into logical units of storage space on one or more on-line disk drives without shutting down the system.

BACKGROUND OF THE INVENTION

A computer system includes an operating system whose primary function is the management of hardware and software resources in the computer system. The operating system handles input/output (I/O) requests from software processes or applications to exchange data with on-line external storage devices in a storage subsystem. The applications address those storage devices in terms of the names of file which contain the information to be sent to or retrieved from them. A file system, which is a component of the operating system, translates the file names into logical addresses in the storage subsystem. The file system forwards the I/O requests to an I/O subsystem which, in turn, converts the logical addresses into physical locations in the storage devices and commands the latter devices to engage in the requested storage or retrieval operations.

The on-line storage devices on a computer are configured from one or more disks into logical units of storage space referred to herein as "containers". Examples of containers include volume sets, stripe sets, mirror sets, and various Redundant Array of Independent Disk (RAID) implementations. A volume set comprises one or more physical partitions, i.e., collections of blocks of contiguous space on disks, and is composed of space on one or more disks. Data is stored in a volume set by filling all of the volume's partitions in one disk drive before using volume partitions in another disk drive. A stripe set is a series of partitions on multiple disks, one partition per disk, that is combined into a single logical volume. Data stored in a stripe set is evenly distributed among the disk drives in the stripe set. A mirror set is composed of volumes on multiple disks, whereby a volume on one disk is a duplicate copy of an equal sized volume on another disk in order to provide data redundancy. A RAID implementation is a collection of partitions, where each partition is composed of space from more than one disk in order to support data redundancy.

In a prior system the I/O subsystem configures the containers through a software entity called a "container manager". Essentially the container manager sets up a mapping structure to efficiently map logical addresses received from the file system to physical addresses on storage devices. The I/O subsystem also includes a software driver for each type of container configuration on the system. These drivers use the mapping structure to derive the physical addresses, which they then pass to the prospective storage devices for storage and retrieval operations.

Specifically, when the computer system is initially organized, the I/O subsystem's container manager configures the containers and maintains the configuration tables in a container layer of the I/O subsystem. In accordance with a co-pending U.S. patent application, Ser. No. 08/964,304, entitled, File Array Storage Architecture by Richard Napolitano et al., the container layer of the I/O subsystem comprises a Device Switch Table, a Container Array, and a Partition Table. The Device Switch table consists of entries, each of which ordinarily points to the entry point of a container driver that performs I/O operations on a particular type of container. The Container Array is a table of entries, each of which ordinarily points to data structures used by a container driver. There is a fixed one-to-one relationship between the Device Switch Table and the Container Array. The Partition Table contains partition structures copied from disk drives for each container on the system. Each Partition Table entry points to one physical disk drive and allows the container driver to access physical location in the on-line storage devices.

When a software process issues an I/O request, the file system accepts the file oriented I/O request and translates it into an I/O request bound for a particular device. The file system sends the I/O request which includes, inter alia, a block number for the first block of data requested by the application and also a pointer to a Device Switch Table entry which points to a container driver for the container where the requested data is stored. The container driver accesses the Container Array entry for pointers to the data structures used in that container and to Partition Table entries for that container. Based on the information in the data structures, the container driver also accesses Partition Table entries to obtain the starting physical locations of the container on the storage devices. Based on the structures pointed to by the Container Array entry and partition structures in the Partition Table, the container driver sends the I/O request to the appropriate disk drivers for access to the disk drives.

In prior systems, the containers are configured during the initial computer setup and can not be reconfigured during I/O processing without corrupting currently processing I/O requests. As storage needs on a computer system change, the system administrators may need to reconfigure containers to add disks to them or remove disks from them, partition disks drives to form new containers, and/or increase the size of existing containers. If containers are reconfigured during I/O processing in the I/O subsystem, the reconfiguration may corrupt or erase the currently processing I/O requests. However, shutting down the system to reconfigure containers may be unacceptable for businesses that require high availability, i.e., twenty-four hours/seven days a week on-line activity. Therefore, it is an object of the present invention to provide a method for reconfiguring containers without shutting down the system and with minimal interruption to on-line processing.

Yet another object of the present invention is to provide a method of routing processing I/O requests in the I/O subsystem to a different container than previously pointed to by the file system.

SUMMARY OF THE INVENTION

In accordance with the invention, when a reconfiguration operation is initialed, the system blocks incoming I/O requests into the container drivers. The drivers queue all incoming I/O requests, continue to process all the preexisting I/O requests and signal the system upon completion. Upon receiving signals from all the container drivers with preexisting I/O requests, the system reconfigures the container tables as requested in the reconfiguration request. When the reconfiguration is complete, the system unblocks the blocked I/O requests and processes them and subsequent requests in accordance with the new configuration. By temporarily blocking the I/O requests and dynamically reconfiguring the container tables while the file system is still processing other I/O requests, this method performs on-line container reconfigurations with minimal interference with other on-line processing.

More specifically, in the preferred embodiment of the invention, at the beginning of container reconfiguration process, the system sets a configuration flag. Each container driver checks the configuration flag before it begins processing an incoming I/O request. If the flag is not set, the container driver processes the I/O request. Otherwise it copies the requests into a linked list queue. Each container driver maintains a process count of the I/O requests that it is currently processing. Upon completing each I/O request, the container driver decrements the process count. When its I/O processing count equals zero, the container driver sends a completion signal to the container manager.

Upon receiving completion signals from all the container drivers with preexisting I/O requests, the container manager executes the configuration process to reconfigure the containers. After reconfiguring the containers, the container manager clears the configuration flag and sends all queued I/O requests through the same device driver switch table entries as initially identified in the I/O request. For those applications using containers involved in the reconfiguration, the switching table entry in their I/O request may point to a different container, the corresponding entry in the Container Array may point to new data structures and there will usually be a corresponding change in the Partition Table.

In an alternative embodiment, instead of sending I/O requests to each container driver after the configuration flag is set, all the incoming I/O requests are queued by the container manager. This enables the container drivers to process all I/O requests they receive without having to check a configuration flag.

BRIEF DESCRIPTION OF THE DRAWINGS

The invention description below refers to the accompanying drawings, of which.

DETAILED DESCRIPTION OF AN ILLUSTRATIVE EMBODIMENT

Figure 1:
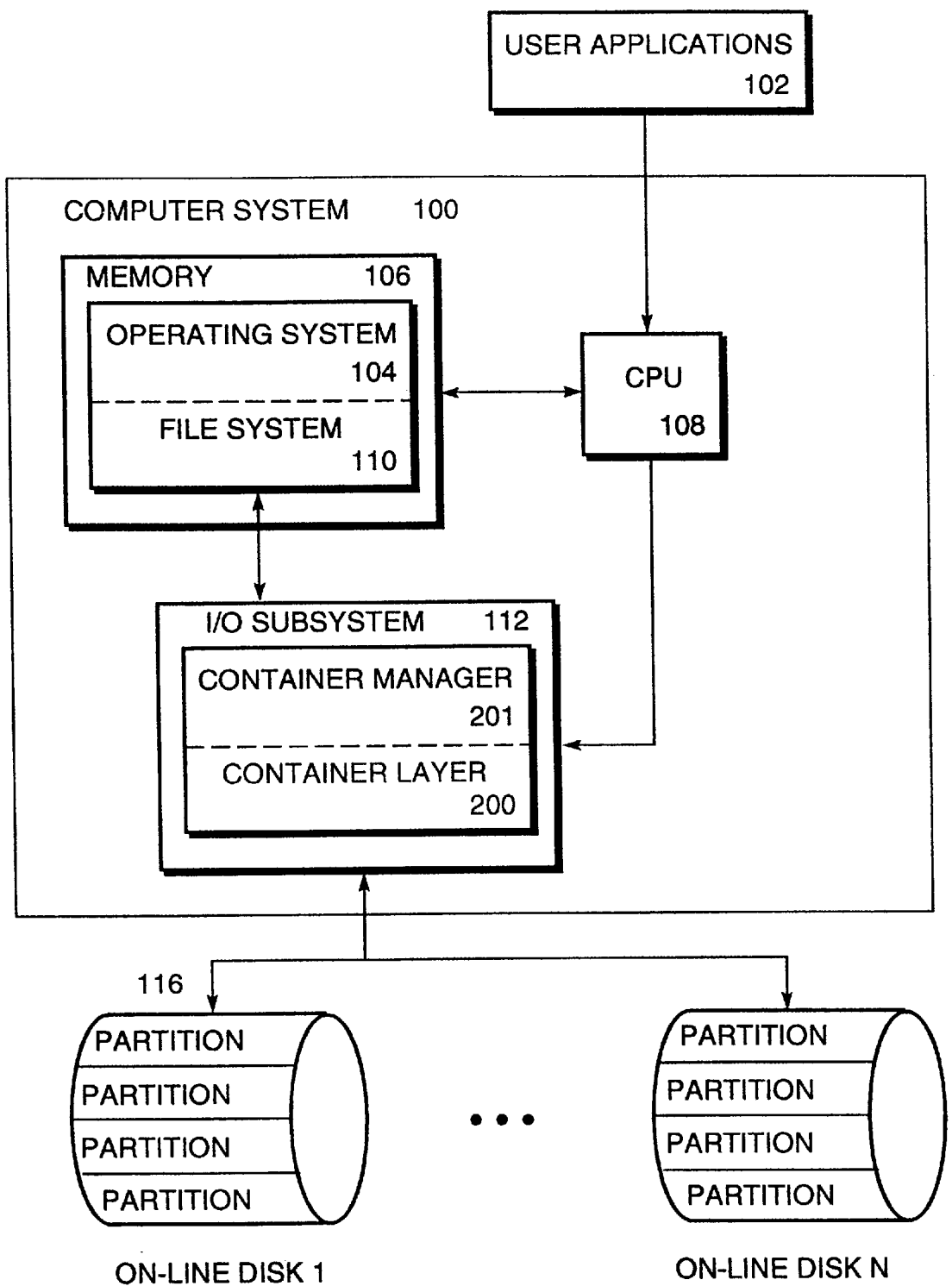
FIG. 1 is a schematic block diagram of a computer system in which the principles of the invention may be practiced.

FIG. 1 is a schematic block diagram of a typical computer system that is configured to perform on-line storage configuration in accordance with the present invention. The computer system 100 comprises a memory 106 and an input/output (I/O) subsystem 112 interconnected with a central processing unit (CPU) 108. The memory 106 comprises storage locations addressable by the CPU 108 and I/O subsystem 112 for storing software programs and data structures. An operating system 104, portions of which are typically resident in the memory 104 and executed by the CPU 108, functionally organizes the computer 100 by, inter alia, handling I/O operations invoked by software processes or application programs executing on the computer. The I/O subsystem 112 is, in turn, connected to a set on-line storage devices 116. These on-line storage devices 116 are partitioned into units of physical space associated with the inventive container reconfiguration described herein.

User applications 102 and other internal processes in the computer system invoke I/O requests from the operating system 104 by file names. A file system 110, which is a component of the operating system 104, translates the file names into logical addresses. The file system 110 forwards the I/O requests to a I/O subsystem 112 which, in turn, converts the logical addresses into physical locations in the storage devices 116 and commands the latter devices to engage in the requested storage or retrieval operations. The I/O subsystem 112 configures the physical storage devices 116 partitions into containers and stores container configuration tables in the container layer 200 of the I/O subsystem 112. Container configuration enables the system administrator to partition a disk drive into one or more virtual disks.

Figure 2A:
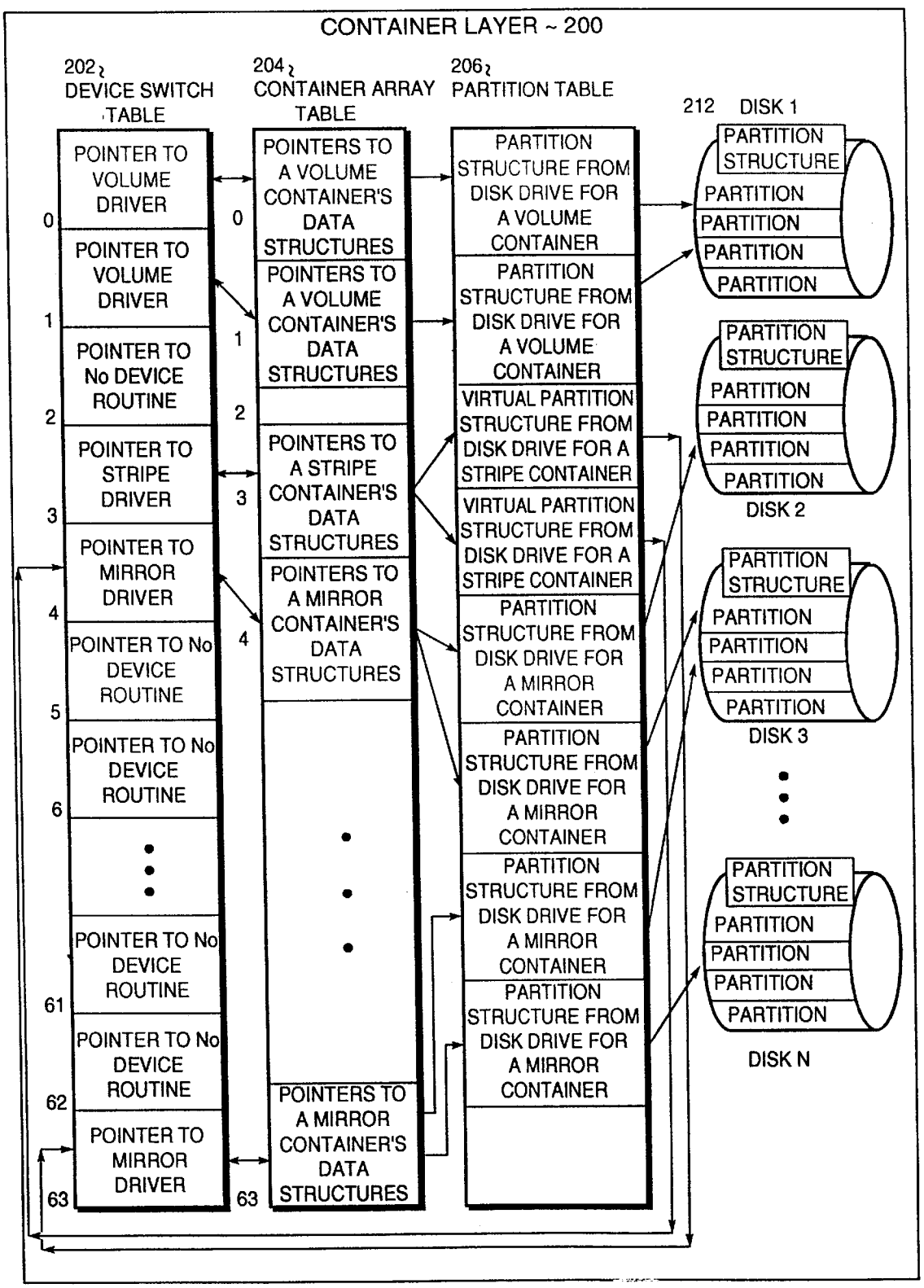
FIGS. 2A and 2B are schematic block diagrams illustrating a container layer of an I/O subsystem.
Figure 2B:
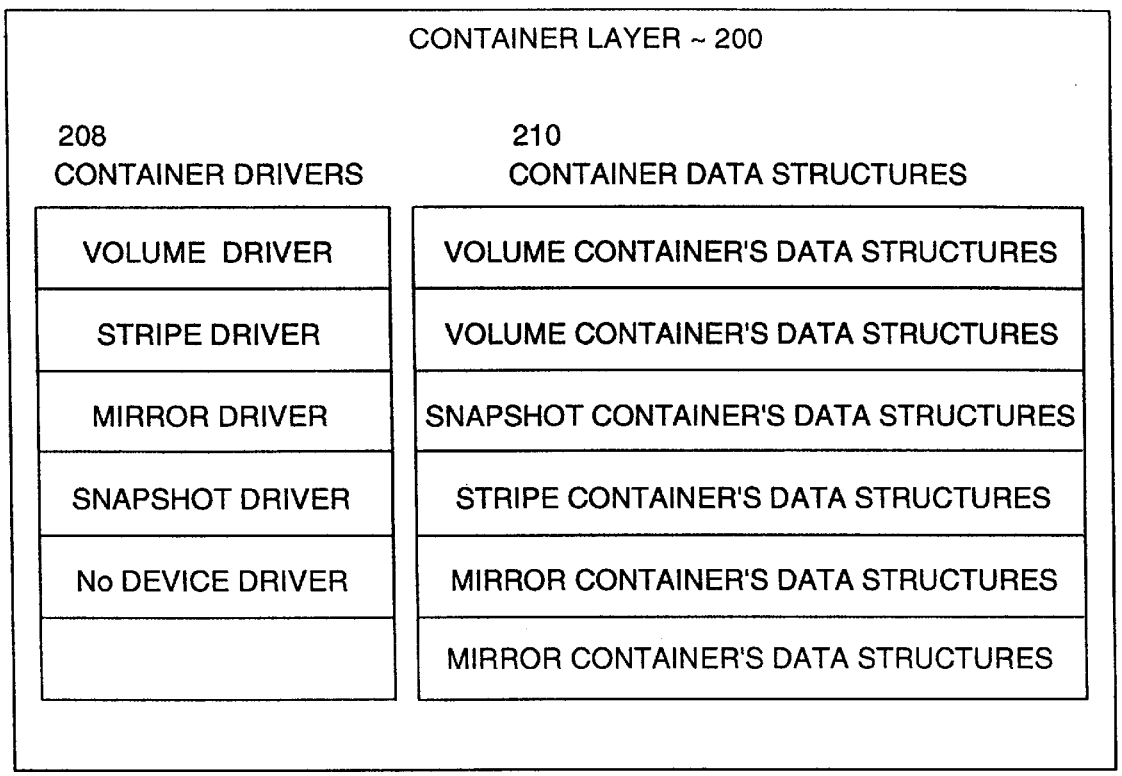

FIGS. 2A and 2B depict the container layer 200 of the I/O subsystem 112 which comprises a Device Switch table 202, a Container Array 204, and a Partition Table 206. The Device Switch Table 202 consists of entries, each entry pointing to the entry point of a container driver 208 which performs I/O operations on a particular type of container. If a Device Switch Table 202 entry does not contain a pointer to a container driver 208, the entry will contain a pointer to a "No Device" routine, which in turn, returns an error when invoked to process I/O requests. The Container Array 204 is a table of entries, each of which ordinarily points to data structures 210 used by the container drivers 208. There is a fixed one-to-one relationship between the Device Switch Table 202 entries and the Container Array (204) entries. The Partition Table 206 contains partition structures copied from disk drives 212 for each container on the system. There is one Partition Table 206 entry for each physical disk drive that in the container.

During container configuration, the configuration process in the container layer 200 reads the disk drives' 212 partition structures and copies the partition structures into a Partition Table 206. After building the Partition Table 206 entries for each container, the configuration process builds the container's data structures 210 and stores pointers to the data structures 210 and the Partition Table 206 entries in the Container Array 204 entries. Then the configuration process loads pointers to the entry points of the appropriate container driver 208 for each container into the Device Switch Table 202 entries. Container layer 202 tables are configurable at the initial computer setup but cannot be reconfigured during I/O processing without possibly corrupting or erasing the currently processing I/O requests in the I/O subsystem 112.

The invention therefore comprises a method of blocking incoming I/O requests into the I/O subsystem 112, queuing the blocked I/O requests, completing currently processing I/O requests in the I/O subsystem, reconfiguring containers, unblocking the I/O requests and processing the I/O requests by using the initially identified Device Switch Table 202 entries. Specifically before container reconfiguration, the container manager 201 sets a configuration flag. Each container driver 208 receiving an incoming I/O request, checks the configuration flag before it begins processing the incoming I/O request. If the flag is not set, the container driver 208 processes the I/O request. If the flag is set, the container driver 208 copies all incoming I,0 requests into a linked list queue. Each container driver 208 maintains a process count of the I/O requests that it is currently processing and after completing an I/O request, the container driver 208 decrements the process count. When the existing I/O processing counter equals zero, the container driver 208 sends a completion signal to the container manager.

Upon receiving completion signals from all the container drivers 208, the container manager 201 executes the configuration process to reconfigure the container. After reconfiguring the containers, the container manager 201 clears the configuration flag and sends all queued I/O requests through the same device driver switch table 202 entries as initially identified in the I/O request. Thus, this method performs on-line container reconfigurations with minimal interference to other on-line processing in the file system.

In an alternative embodiment, instead of having each container driver 208 check the configuration flag and queue the incoming I/O requests, the container manager 201 queues all incoming I/O requests after it sets the configuration flag. This enables the container driver to process all I/O requests it receives without having to check the configuration flag.

Figure 3A:
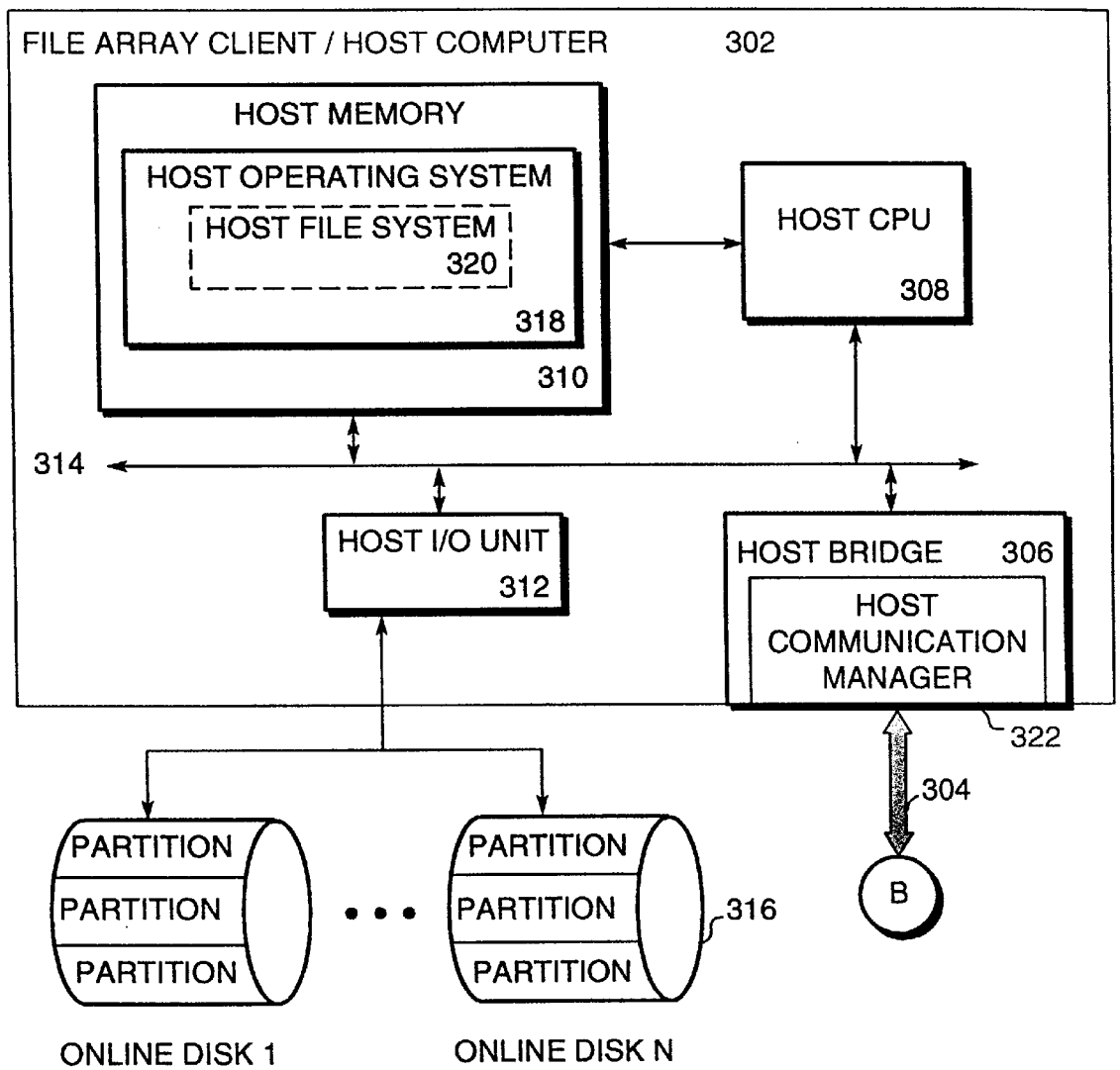
FIGS. 3A and 3B illustrate a preferred embodiment of a data processing system having a distributed file system architecture configured to implement the on-line container configuration process.
Figure 3B:
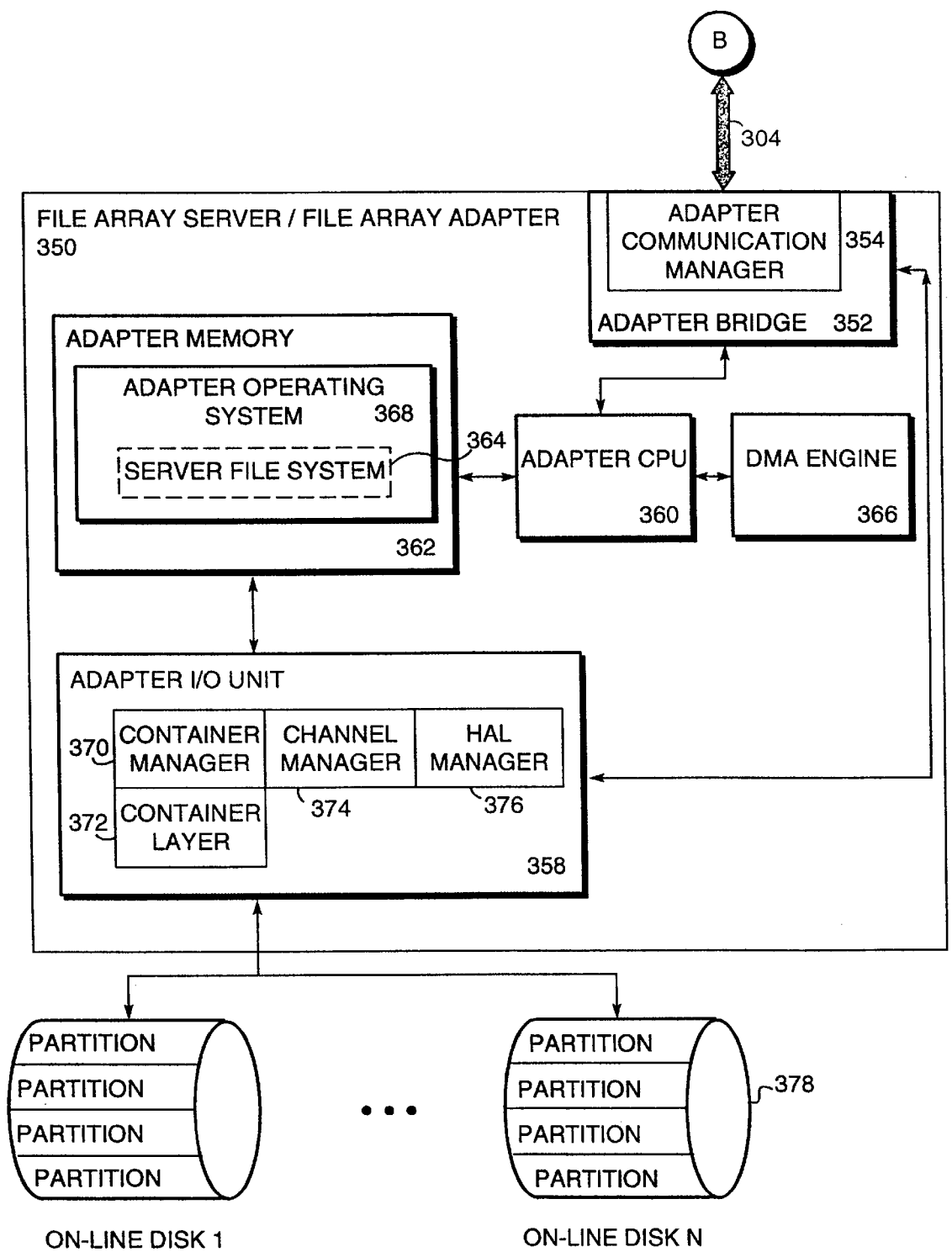

FIGS. 3A and 3B illustrate a preferred embodiment of a data processing platform having a distributed file system architecture configured to implement the on-line container reconfiguration method. The data processing platform comprises a host computer 302 coupled to a file array adapter 350 over a low latency interface 304. The low-latency interface 304 is preferably a peripheral component interconnect (PCI) bus that connects to the host computer 302 through a host bridge 306 and to the adapter 350 through an adapter bridge 352. It should be noted that other interfaces may be used with the present invention.

The host computer 302 comprises a host central processing unit (CPU) 308, a host memory 310, and a host input/output (I/O) unit 312 interconnected by a system bus 314. The host I/O unit 312 is connected to a set of on-line storage devices 316. The host operating system 318, portions of which are typically resident in host memory 310 and executed by the host CPU 308, functionally organizes the host computer by, inter alia, handling I/O requests. The host file system 320, a component of the host operating system 318, interfaces with the host communications manager 322 which exchanges I/O requests and responses over the interface 304 with a adapter communications manager 354. The host operating system 318 is preferably the Windows NT operating system (hereinafter "Windows NT") developed by Microsoft Corporation. Windows NT incorporates an I/O system that delivers I/O requests to file systems and returns results to applications. File systems are viewed by Windows NT as sophisticated device drivers that can be dynamically loaded into the operating system; the file array adapter 350 thus "plugs into" the Windows NT operating system and, as a result, an adapter I/O subsystem 358 generally replaces the Windows NT host I/O system. It should be noted, however, that the invention described herein may function on any operating system.

The file array adapter comprises an adapter CPU 360 coupled to an adapter memory 362 and an adapter file system 364, a component of the adapter operating system 368. The adapter file system 364 interfaces with the adapter communications manager 354 and the adapter I/O subsystem 358. A direct memory access (DMA) engine 366 coupled to the adapter CPU 360 enables the adapter 350 to execute DMA operations with the host computer 302. The adapter 350 further include an adapter I/O subsystem 358, which comprises the container manager 370 in the container layer 372, a channel manager 374 and a hardware abstraction layer (HAL) 376. The adapter I/O subsystem is connected to a set of on-line storage device 378. The channel manager 374 implements protocols for communicating with the disk drives 378 and, to that end, performs the functions of conventional device-specific drivers such as, a small computer system interface (SCSI) drivers, and port drivers. HAL 376 directly manipulates the hardware and insulates the software components from hardware details. The container manager 370, a software entity that configures containers, is independent of the adapter file system 364, thus, the file array adapter 350 can be used either as a file system controller or, in an alternate embodiment, as a block I/O controller. In this latter embodiment, the adapter file system 364 is bypassed and I/O requests occur directly between the communication manager and container manager.

Figure 4A:
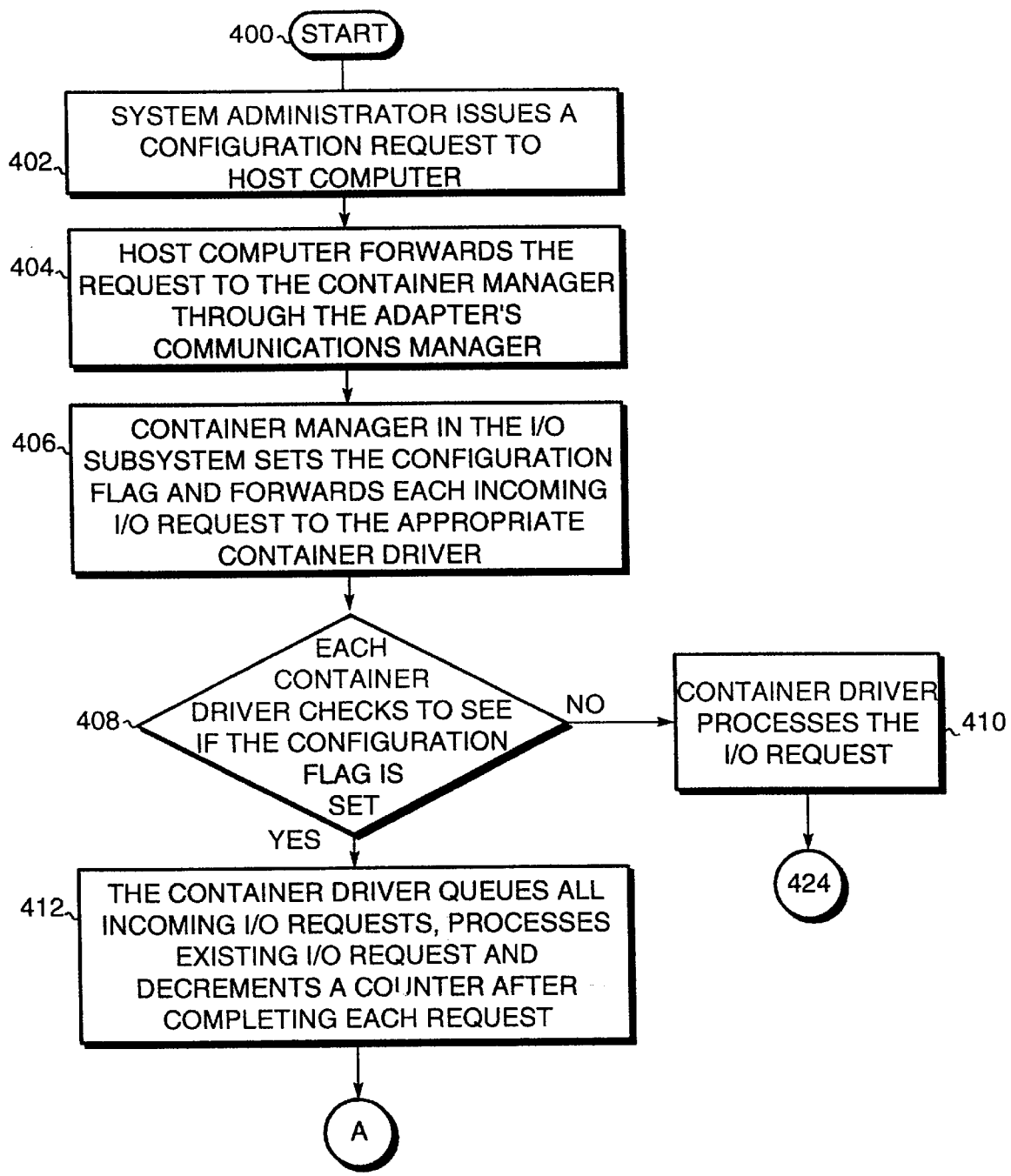
FIGS. 4A and 4B are flowcharts illustrating the sequence of steps followed by a container configuration process in the preferred embodiment in FIGS. 3A and 3B.
Figure 4B:
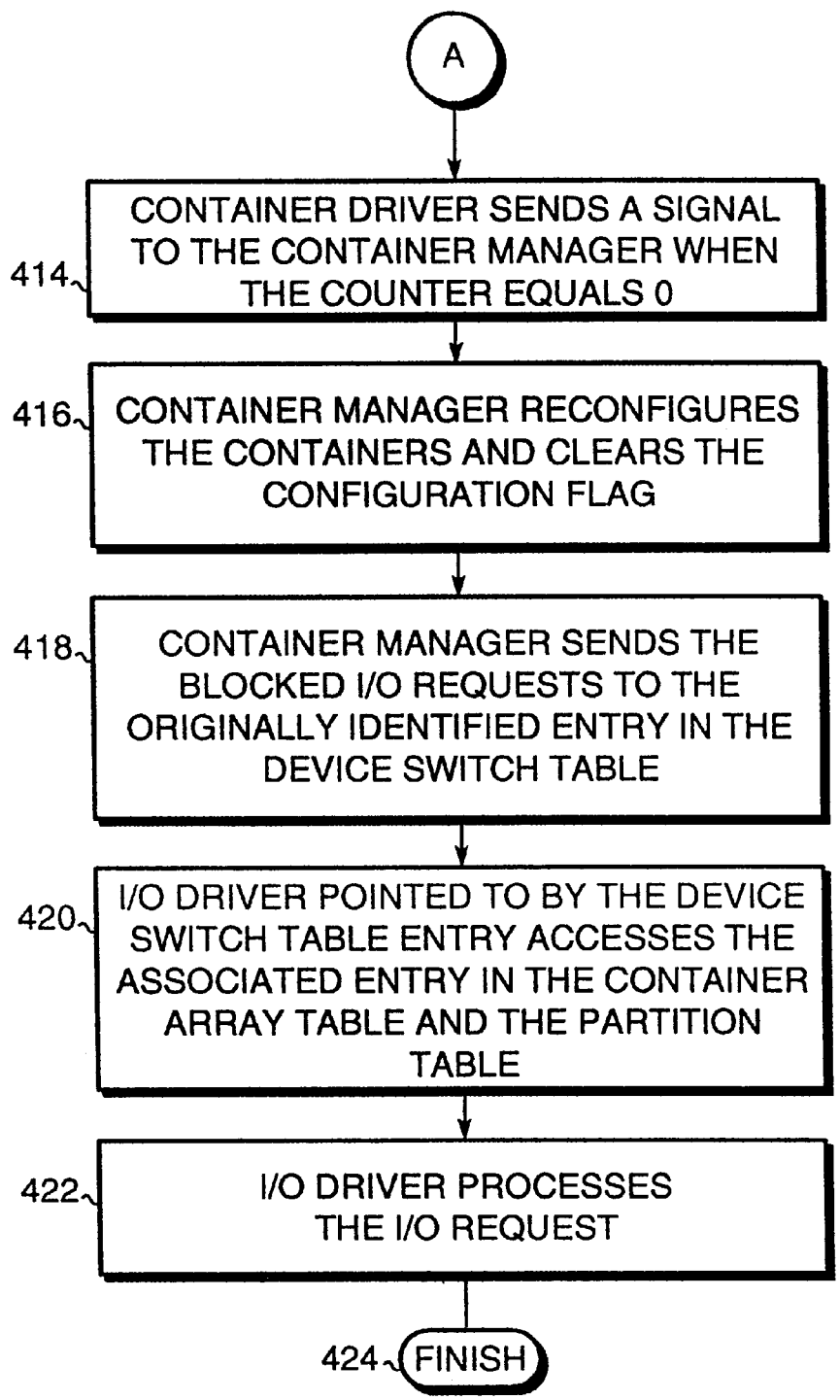

FIGS. 4A and 4B are flowcharts illustrating the sequence of steps employed when performing an on-line container reconfiguration on a distributed file system in accordance with the invention. The sequence starts at Step 400 and proceeds to Step 402 where the user application or system process issues an I/O request to the host computer 302. The host computer 302 accepts the configuration request forward it to the container manager 370 in Step 404. The container manager 370 sets the configuration flag and forwards each I/O request to the appropriate container driver 208 in Step 406. Before it processes the incoming I/O request, the container driver 208 checks the configuration flag to determine if container reconfiguration is about to occur at Step 408. If the flag is not set, the container driver 208 processes the I/O request in Step 410. If the flag is set, the driver 208 copies all incoming I/O requests into a linked list queue and completes the existing I/O requests. Upon completing an I/O request, the container driver 208 decrements the existing I/O request process count at Step 412. When the existing I/O processing counter equals zero, the container driver 208 sends a completion signal to the container manager 370 in Step 414.

The container manager 370 executes the configuration process to reconfigure containers after receiving completion signals from all drivers 208 in Step 416. After reconfiguring the containers, the container manager 370 clears the configuration flag and sends all queued I/O requests through the same device driver switch table 202 entry as initially requested in the I/O request structure at Step 418. The container driver 208 pointed to by the Device Switch Table 202 entry accesses an associated Container Array Table 204 entry pointing to the data structures 210 for that container. Based on the information in the data structures 210, the container driver 208 accesses a Partition Table 206 entry to obtain the starting location of the container on the storage devices in Step 420. The container driver then processes the I/O request at Step 422 and returns the results to the host computer 320.

Figure 5:
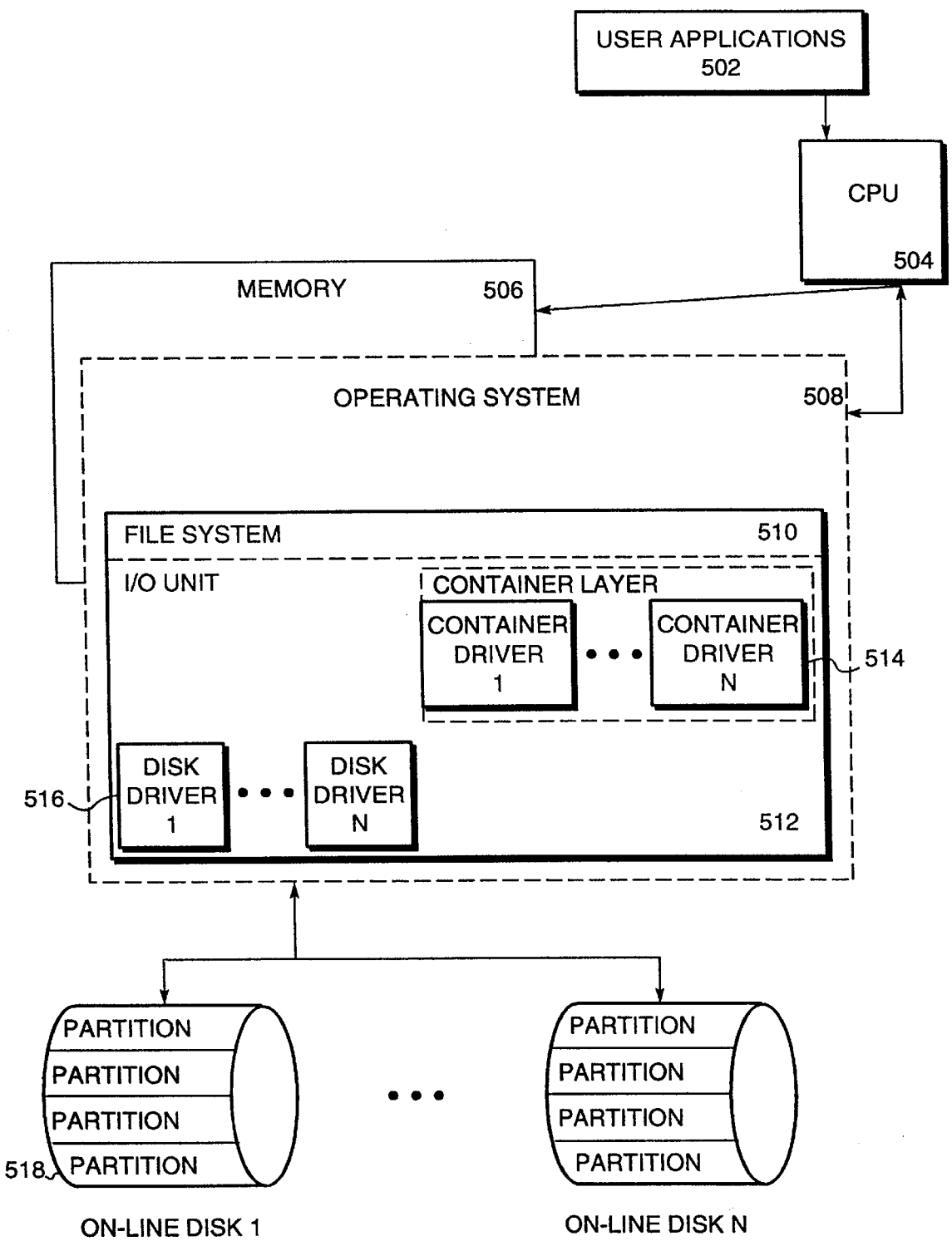
FIG. 5 illustrates an alternative embodiment of a data processing system configured to implement the on-line configuration process.

While there has been shown and described an illustrative embodiment of a mechanism that enables container reconfiguration, it is to be understood that various other adaptations and modifications may be made within the spirit and scope of the invention. For example in an alternate embodiment of the invention, the file system and the I/O subsystem of the data processing platform need not be distributed but may, in fact, be resident on the host computer. FIG. 5 depicts such an alternative embodiment of a data processing platform configured to implement the container configuration mechanism; an example of this file system is the Windows NT File System (NTFS) configured to operate on the Windows NT operating system.

When a user application 502 issues an I/O request to the CPU 508, the file system 510, which is a component of the operating system 504, initially attempts to resolve the request by searching the host computer memory 506. If it cannot resolve the request, then the file system 510 services the request by retrieving the file from disks 518 through the appropriate container driver 514 in the I/O Unit 512. The container driver 514 then forwards the I/O request to the appropriate disk driver 516 with access to the physical disk drives 518.

The foregoing description has been directed to specific embodiments of this invention. It will be apparent, however, that other variations and modifications may be made to the described embodiments, with the attainment of some or all of their advantages. Therefore, it is the object of the appended claims to cover all such variations and modifications as come within the true spirit and scope of the invention.

What is claimed is:

1. A data processing system including an I/O subsystem, the system comprising:

one or more storage devices having divided partitions that are configured as containers;

a partition table that stores partition information copied from the storage devices;

one or more container drivers that process I/O requests directed to the containers;

a device switch table that contains pointers to entry points of container drivers;

a container array table that contains pointers to data structures used by the container drivers, wherein each entry in the container array table has an associated entry in the device switch table;

means for reconfiguring, by an initiation of a reconfiguration process, the storage devices into containers while the data processing system is performing other services, including means for (a) blocking all new I/O requests to the I/O subsystem in response an initiation of a reconfiguration process, (b) completing processing of the I/O requests previously received by the I/O subsystem, (c) unblocking the new I/O requests and (d) executing the new I/O requests after being unblocked by the means for unblocking based upon entry points that are the same as entry points to which the blocked I/O requests pointed prior to the initiation of the reconfiguration process; and means for changing the entries of the device switch table, the container array table, and the partition table to reflect the reconfiguration.

2. The data processing system as set forth in claim 1 wherein the means for blocking includes means for queuing the new I/O requests to the I/O subsystem.

3. The data processing system as set forth in claim 2 wherein the means for unblocking includes means for releasing queued I/O requests to each container driver pointed to by the respective of the entry points.

4. The data processing system as set forth in claim 2 wherein the means for reconfiguring further includes means for initiating the reconfiguration process by asserting a configuration flag in response to the I/O request to reconfigure the containers.

5. The data processing system as set forth in claim 4 further comprising means, responsive to the means for completing processing of the I/O requests previously received by the I/O subsystem, for decrementing a process count, and means for sending a signal to the I/O subsystem when the process count equals zero.

6. The data processing system as set forth in claim 5 wherein the means for changing includes means for clearing the configuration flag.

7. The data processing system as set forth in claim 2 further comprising the step of repeating the reconfiguration process in response to each container driver's completion of a blocked I/O request.

8. A computer readable medium executing on a data processing system including an I/O subsystem, the computer readable medium including program instructions for performing the steps of:

configuring one or more storage devices having divided as containers;

storing partition information copied from the storage devices in a partition table;

processing I/O requests directed to the containers with one or more container drivers;

providing a device switch table that contains pointers to entry points of container drivers;

providing a container array table that contains pointers to data structures used by the container drivers, wherein each entry in the container array table has an associated entry in the device switch table;

reconfiguring, by an initiation of a reconfiguration process, the storage devices into containers while the data processing system is performing other services, including (a) blocking all new I/O requests to the I/O subsystem in response an initiation of a reconfiguration process, (b) completing processing of the I/O requests previously received by the I/O subsystem, (c) unblocking the new I/O requests and (d) executing the new I/O requests after being unblocked by the means for unblocking based upon entry points that are the same as entry points to which the blocked I/O requests pointed prior to the initiation of the reconfiguration process; and changing the entries of the device switch table, the container array table, and the partition table to reflect the reconfiguration.

9. The computer readable medium as set forth in claim 8 wherein the step of unblocking includes releasing queued I/O requests to each container driver pointed to by the respective of the entry points.

10. The computer readable medium as set forth in claim 8 wherein the step of reconfiguring further includes initiating the reconfiguration process by asserting a configuration flag in response to the I/O request to reconfigure the containers.

* * * * *